United States Patent
Huang

(10) Patent No.: US 9,057,913 B2
(45) Date of Patent: Jun. 16, 2015

(54) LIQUID CRYSTAL DISPLAY MODULE AND METHOD FOR MAKING SAME

(71) Applicant: HON HAI PRECISION INDUSTRY CO., LTD., New Taipei (TW)

(72) Inventor: Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 62 days.

(21) Appl. No.: 13/710,489

(22) Filed: Dec. 11, 2012

(65) Prior Publication Data

US 2014/0049725 A1 Feb. 20, 2014

(30) Foreign Application Priority Data

Aug. 16, 2012 (TW) .............................. 101129718 A

(51) Int. Cl.
*G02F 1/1335* (2006.01)
*H01J 9/24* (2006.01)

(52) U.S. Cl.
CPC ............. *G02F 1/133606* (2013.01); *H01J 9/24* (2013.01)

(58) Field of Classification Search
CPC ...................... G02F 1/133504; G02F 1/133526
USPC ......................................... 349/64, 62; 355/67
See application file for complete search history.

(56) References Cited

U.S. PATENT DOCUMENTS

| | | | |
|---|---|---|---|
| 6,359,668 B1 * | 3/2002 | Iijima et al. ...................... 349/61 |
| 2007/0114913 A1* | 5/2007 | Lin et al. ........................ 313/496 |
| 2007/0263140 A1* | 11/2007 | Hinata ............................. 349/96 |
| 2009/0066881 A1* | 3/2009 | Park ................................. 349/69 |
| 2009/0160819 A1* | 6/2009 | Sasaki et al. .................. 345/174 |
| 2011/0117357 A1* | 5/2011 | Hatanaka et al. .......... 428/312.8 |
| 2011/0141392 A1* | 6/2011 | Noh ................................. 349/61 |
| 2011/0298738 A1* | 12/2011 | Takahashi et al. ............. 345/173 |
| 2011/0310326 A1* | 12/2011 | Kitada ............................. 349/61 |

FOREIGN PATENT DOCUMENTS

KR 2002-0043314 * 6/2002 ............. C03B 33/09

* cited by examiner

*Primary Examiner* — Sang V Nguyen
(74) *Attorney, Agent, or Firm* — Novak Druce Connolly Bove + Quigg LLP

(57) ABSTRACT

A liquid crystal display module includes a light source and a liquid crystal module. The liquid crystal module includes a top glass substrate, a bottom glass substrate and a liquid crystal layer sandwiched between the top glass substrate and the bottom glass substrate. The bottom glass substrate covers the light source, and has a hollow inner space. A top wall of the inner space presents a number of microstructures extending down to the light source, for scattering light emitted from the light source before the emitted light enters the liquid crystal layer.

9 Claims, 4 Drawing Sheets

LIQUID CRYSTAL DISPLAY MODULE AND METHOD FOR MAKING SAME

BACKGROUND

1. Technical Field

The present disclosure relates to a liquid crystal display module and a method for making the liquid crystal display.

2. Description of Related Art

A liquid crystal display module includes a light source, a light guide plate, a diffusion plate and a liquid crystal module which includes glass substrates, liquid crystal, and electrodes. The liquid crystal module has a multiplicity of elements, such that a minimal thickness of the liquid crystal module must be accepted, and assembly of the liquid crystal module is labour-intensive.

What is needed, therefore, is a liquid crystal display module and a method for making same, which can overcome the above shortcomings.

BRIEF DESCRIPTION OF THE DRAWINGS

Many aspects of the present liquid crystal display module and method can be better understood with reference to the following drawings. The components in the drawings are not necessarily drawn to scale, the emphasis instead being placed upon clearly illustrating the principles of the present liquid crystal display module and method. Moreover, in the drawings, like reference numerals designate corresponding parts throughout the several views.

DETAILED DESCRIPTION

Embodiments of the present liquid crystal display module and method will be described with reference to the drawings.

Figure 1:
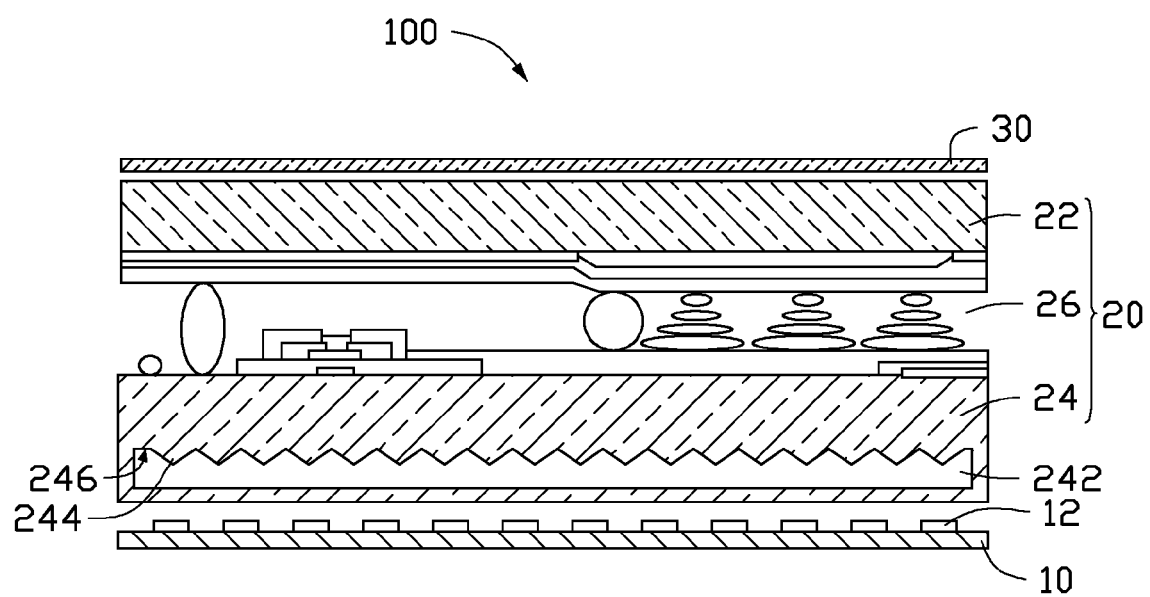
FIG. 1 is a schematic view of a liquid crystal display module in accordance with an embodiment.

Referring to FIG. 1, a liquid crystal display module 100 in accordance with an embodiment is provided. The liquid crystal display module 100 includes a light source 10, a liquid crystal module 20 and a transparent panel 30.

The light source 10 includes a plurality of LEDs 12. In other embodiments, the light source 10 can be other forms of lighting. The transparent panel 30 can be flexible panel 30.

The liquid crystal module 20 includes a top glass substrate 22, a bottom glass substrate 24 and a liquid crystal layer 26 sandwiched between the top glass substrate 22 and the bottom glass substrate 24. The bottom glass substrate 24 faces toward the light source 10, and has an inner space 242 formed therein. The liquid crystal layer 26 may include liquid crystals, driving circuits, electrodes, and spacers.

The inner space 242 is exposed at the front side and the back sides of the bottom glass substrate 24, but is sealed at the remaining sides of the bottom glass substrate 24. That is, the bottom glass substrate 24 is still an integral piece. A height H of the inner space 242 is about 100 micrometers. A top wall 246 of the inner space 242 has an inner surface facing towards the light source 10, and the inner surface has a plurality of microstructures 244 for scattering light. In the present embodiment, each of the microstructures 244 presents a V shape in section and the microstructures 244 are continuous. In other embodiments, the microstructures 244 can be spaced dots.

Figure 2:
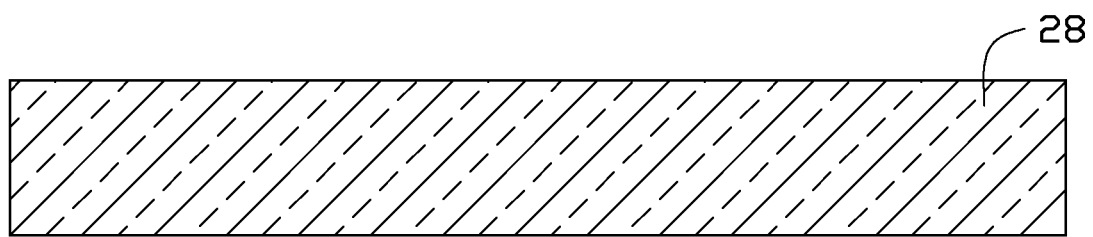
FIG. 2 is a schematic view of a bottom glass substrate to be machined in accordance with an embodiment.
Figure 3:
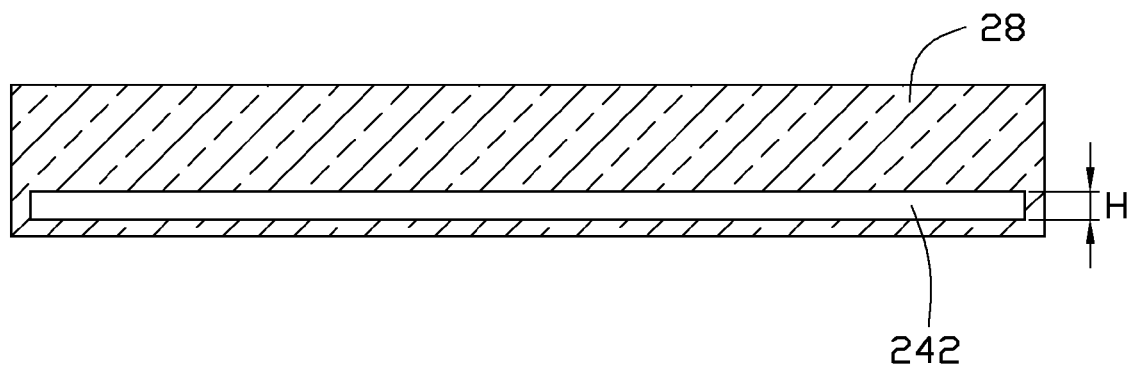
FIG. 3 shows the bottom glass substrate of FIG. 2 as first machined.
Figure 4:
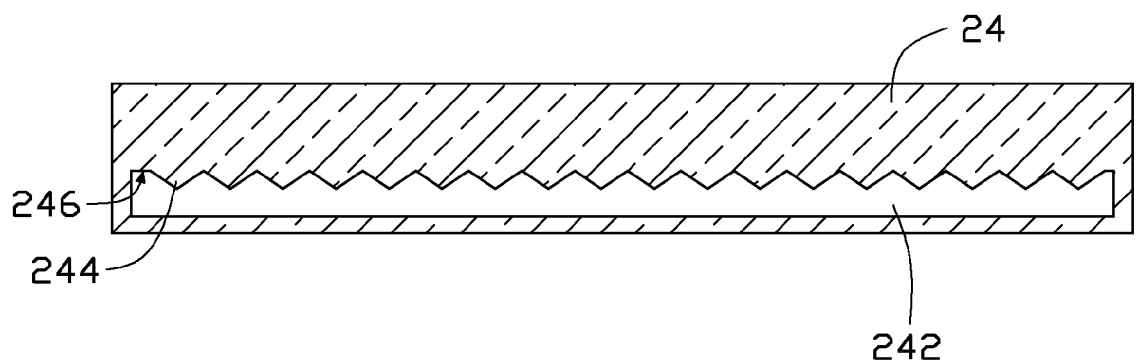
FIG. 4 shows the bottom glass substrate of FIG. 3 after further machining.

Referring to FIGS. 2 to 4, a method for making the liquid crystal display module 100 includes the following steps:

First, a light source 10, a transparent panel 30, a top glass substrate 22 and a bottom glass substrate 28 are provided.

Then machining or otherwise creating an inner space 242 in the bottom glass substrate 28, using a $CO_2$ laser, from one side of the bottom glass substrate 28. A height H of the inner space 242 is about 100 micrometers. The inner space 242 is exposed to both a front side and a back side of the bottom glass substrate 28, and is sealed to the remaining sides of the bottom glass substrate 28. The bottom glass substrate 28 is still an integral piece. A wavelength of the $CO_2$ laser is about 10.6 micrometers.

Next, machining or otherwise creating a plurality of microstructures 244 in a top wall 246 of the inner space 242 using a YAG (yttrium aluminium garnet) laser both from the front side and from the back side of the bottom glass substrate 28, thereby forming a bottom glass substrate 24 for the liquid crystal display module 100. A wavelength of the YAG laser is about 1064 nanometers.

Then a liquid crystal layer 26 is mounted between the top glass substrate 22 and the bottom glass substrate 24.

Finally, the light source 10 is mounted under the bottom glass substrate 24, with the microstructures 244 facing toward the light source 10, and the transparent panel 30 is mounted on the top glass substrate 22.

In application, light emitted from the light source 10 passes through the inner space 242 of the bottom glass substrate 24, and is scattered by the microstructures 244, before the scattered light enters the liquid crystal layer 26.

As the microstructures 244 of the bottom glass substrate 24 can scatter light, the need for an extra light guide plate or diffusion plate for the liquid crystal display module 100 is avoided, and the minimal thickness of the liquid crystal display module 100 is thus reduced.

The liquid crystal display module 100 is suitable for small size electronic devices.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A liquid crystal display module, comprising:
   a light source; and
   a liquid crystal module comprising a top glass substrate, a bottom glass substrate and a liquid crystal layer sandwiched between the top glass substrate and the bottom glass substrate, the bottom glass substrate being arranged adjacent to the light source, the bottom glass substrate having a hollow inner space, and a top wall having an inner surface exposed toward the inner space, a plurality of microstructures formed on the inner surface for scattering light emitted from the light source, the light source being opposite to the side of the bottom glass substrate far from the top glass substrate.

2. The liquid crystal display module of claim 1, wherein the microstructures include a plurality of contiguous V-shaped microstructures.

3. The liquid crystal display module of claim 1, wherein the microstructures include a plurality of spaced dots.

4. The liquid crystal display module of claim 1, wherein the inner surface of the top wall facing toward the light source.

5. The liquid crystal display module of claim 1, further comprising a flexible panel arranged above the top glass substrate.

6. A method for making a liquid crystal display module, comprising:

provide a light source, a top glass substrate, and a bottom glass substrate;

machining a hollow inner space in the bottom glass substrate using a CO2 laser from a front side or a back side of the bottom glass substrate, and causing the inner space to be exposed to the front side and the back side, and sealed at remaining sides of the bottom glass substrate;

machining a plurality of microstructures in a top wall of the inner space using a YAG laser from the front side or the back side of the bottom glass substrate, thereby forming a bottom glass substrate for the liquid crystal display module;

mounting the liquid crystal layer between the top glass substrate and the bottom glass substrate; and arranging the light source to the bottom glass substrate with the microstructures facing toward the light source, the light source being opposite to the side of the bottom glass substrate far from the top glass substrate.

7. The method of claim 6, wherein the microstructures include contiguous V-shaped microstructures.

8. The method of claim 6, wherein the microstructures include a plurality of spaced dots.

9. The method of claim 6, further comprising arranging a flexible panel above the top glass substrate.

\* \* \* \* \*